Oct. 11, 1949.   I. E. COFFEY   2,484,781
WINDSHIELD WIPER MOTOR CONTROL
Filed April 9, 1947   2 Sheets-Sheet 1
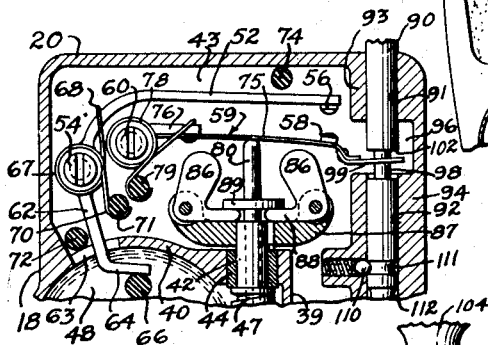
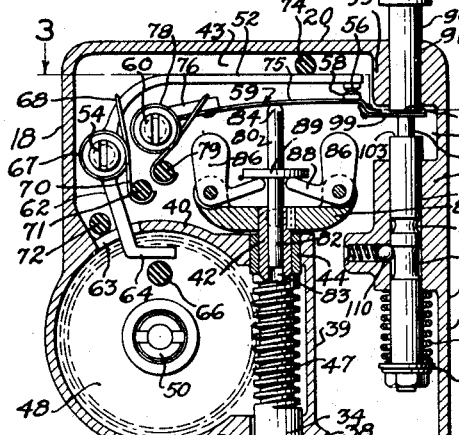
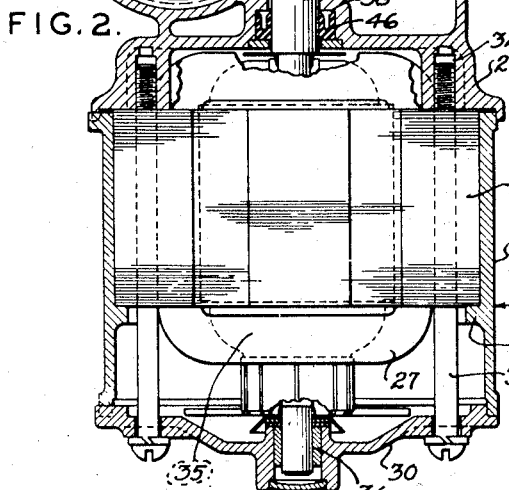
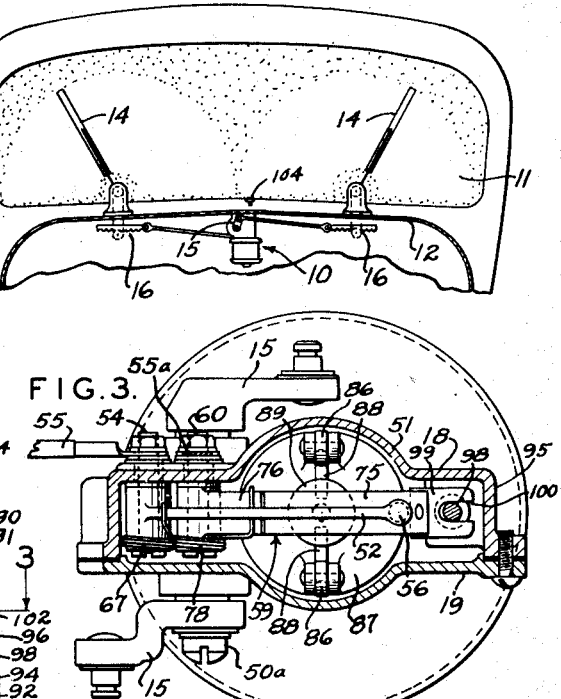
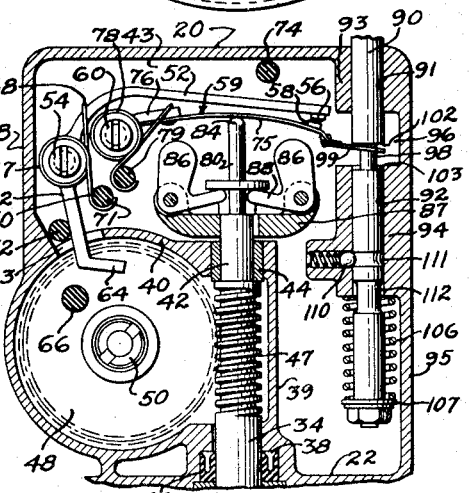
INVENTOR
IRVEN E. COFFEY
BY
George R. Ericson
ATTORNEY

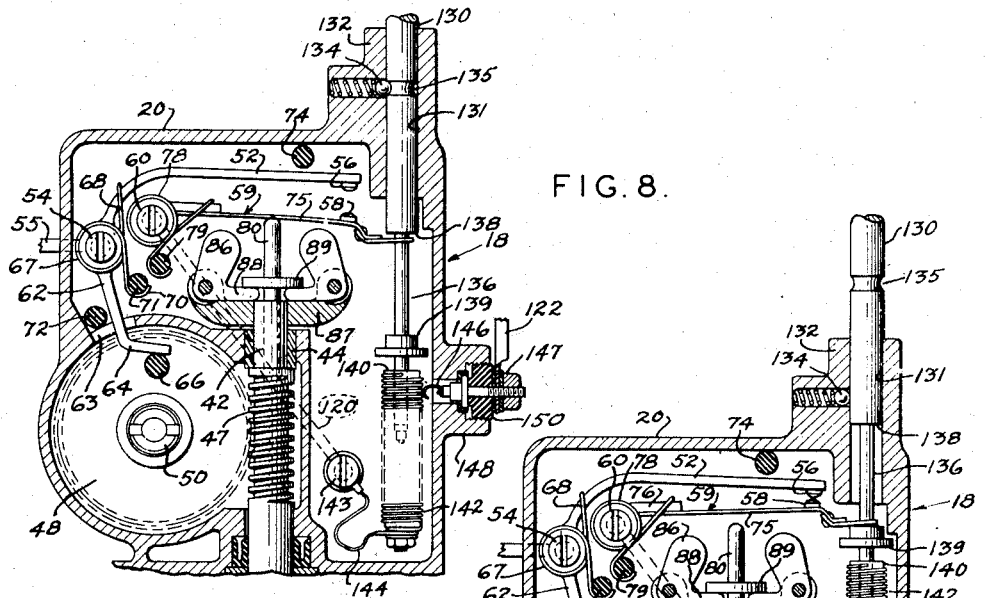

Patented Oct. 11, 1949

2,484,781

UNITED STATES PATENT OFFICE 2,484,781

WINDSHIELD WIPER MOTOR CONTROL

Irven E. Coffey, St. Louis, Mo., assignor to George R. Ericson, Kirkwood, Mo., as trustee Application April 9, 1947, Serial No. 740,376

13 Claims. (Cl. 318—466)

This invention relates to windshield wipers of the electrically operated type for use, for instance, on automotive vehicles, and has particular reference to the provision of novel and effective electric motor control and wiper parking means.

An important object of the invention is to provide an electric motor operated wiper mechanism embodying control means for starting and stopping wiper action, wherein the control means according to the present improvements, includes means effective for retaining the motor energizing circuit closed under normal wiper operating conditions, but which is operable automatically in the event of abnormally low motor speed as may result, for example, from a weak battery or overloading of the wiper blades, to cause opening of the motor energizing circuit and hence stoppage of wiper operation.

Another object is to provide in an electric motor operated wiper mechanism, control means therefor of the character above indicated, which is effective automatically to determine stoppage of wiper action with the wiper blades located or parked at one end of the wiping stroke such as to be out of range of vision through the windshield.

A further object is to provide wiper control means including a manually operated element, which is operable to cause motor operation of the wipers solely in response to actuation of the manually operable element, and which upon release of the manual element, will effect motor stoppage with the wiper blades parked at one end of the wiper stroke, in the event for any reason the motor does not attain at least a predetermined minimum operating speed.

A further object is to provide in a wiper control of the character hereinabove indicated, a motor speed control device operable at will to vary the wiper speed, and arranged so as to determine low speed operation of the motor with high starting torque, upon manually effected closure of the motor circuit control switch.

Yet another object is to afford an electric windshield wiper operating units comprising an electric motor and control mechanism, which is advantageously compact and inexpensive of manufacture, and which is durable and highly effective in operation.

Other objects and advantages of the present invention will appear from the following description having reference to the accompanying drawings wherein Fig. 1 illustrates the presently improved wiper operating unit and wipers in application to the windshield of an automotive vehicle.

Fig. 2 is an enlarged vertical section of the wiper operating unit, showing the motor control switch in a closed position.

Fig. 3 is a view in horizontal section through the unit, as taken on line 3—3 in Fig. 2.

Fig. 4 is a fragmentary vertical section of the unit, taken in the zone of the control means and illustrating the relative positions of the parts thereof when the unit is inactive.

Fig. 5 is a sectional view somewhat like that of Fig. 4, but illustrating the relative positions of the control elements as conditioned for causing stoppage of the motor.

Fig. 6 is a wiring diagram of the unit and motor energizing circuit, including a speed control resistance.

Fig. 7 is a sectional view corresponding somewhat to that of Fig. 4, but illustrating the embodiment in the control, of a speed regulating resistance for the motor, this view further showing the control elements conditioned for motor operation, and Fig. 8 is a sectional view similar to Fig. 7, but showing the relative positions of the control elements in the inactive condition of the unit.

With reference first to Fig. 1, the operating unit 10 of the windshield wiper mechanism, is shown as mounted centrally below the windshield 11 of an automotive vehicle, preferably in depending relation to the vehicle body cowl part 12. A pair of wiper blades 14, each shown as having an operating or wiping stroke of approximately 180 degrees, are driven from the cranks 15 (Fig. 3) of the unit 10, through any suitable or well known operating linkage, as for example by the rack and pinion drive, indicated generally at 16. The type or character of drive between the cranks 15 and the wiper blades 14 is of no particular importance here, and similarly with respect to the stroke or extent of wiper swing, as the operating unit may be applied to wipers of any desired character, as those adapted for other or less than 180 degree strokes.

Figs. 2 and 3 illustrate the presently improved wiper operating unit 10, and as there shown the unit includes a control housing or casing 18 preferably formed as a single casting with an open side normally closed by a cover 19 (Fig. 3). The upper end of the housing is closed by an integral top wall 20, while the lower end wall 22 of the housing is enlarged and of generally circular, bell shape to afford an end closure for the motor frame housing 23 of an electric motor 24. The motor field core 26 supporting field winding 27, is supported in motor frame 23 upon an internal frame flange 28, while the lower motor housing end wall 30 and housing 23 together with the field elements, are supported in assembly with the end closure 22 of the control housing by through-bolts or studs 31 threadedly received in threaded openings 32 in wall 22. The motor field and stationary frame elements of the motor are thus removably assembled or clamped to the control housing.

The vertically arranged motor shaft 34 carrying the motor armature 35 shown in dotted outline, is rotatably journalled and operatively supported at its lower end, by a bearing assembly 36 carried in the lower motor end wall 30. The shaft above the motor is extended through an opening 38 in the control housing end wall 22, upwardly in a chambered boss 39 formed interiorly of the housing 18, and through the top wall 40 of the boss to exposure of its uppermost end portion 42 in the chamber 43 of housing 18, as for a purpose to appear. Operatively supporting the upper end of the motor shaft is a suitable bearing 44 in the top wall 40 of the boss 39, while the shaft in its extension through opening 38, is provided with a running seal in the opening, effected by a suitable flexible or resilient sealing collar 46.

As here preferred, motor drive of the wiper operating cranks 15 is effected by a speed reducing drive comprising worm 47 on the portion of the motor shaft in the chambered boss 39, engaging a worm gear 48 therein suitably secured on or keyed to a shaft 50 journalled in the control housing side wall 51 and cover 19. The ends of the shaft 50 project outwardly from the control housing for operative support of the cranks 15 (Fig. 3) secured thereon by screw 50a. While the worm 47 is shown as being an integral part of the motor shaft, it may be provided as a separate element and keyed or otherwise secured upon the shaft, if such be desired.

In the upper zone of housing chamber 43 is a switch assembly for controlling the motor energizing circuit, the switch according to the present improvements comprising an angulate contact arm 52 pivotally supported upon a stud 54 mounted in the side wall 51 and suitably electrically insulated therefrom. Stud 54 is projected externally of the housing and serves as a connector post for a motor circuit lead 55. On the free end of arm 52 is one contact element 56 of the switch, the cooperating contact 58 being carried by a second switch arm 59 similarly pivotally supported on a stud 60 carried by housing wall 51 and electrically insulated therefrom. Stud 60 similarly to the stud 54, is projected externally of the housing to provide a terminal or connector post for motor energizing circuit connection 55a of the switch.

Pivotal switch arm 52 is a substantially rigid member, as presently preferred, and is formed to provide an arm extension 62 on the opposite side of the pivot stud 54, projecting through an opening or slot 63 in the top wall 40 of the chambered boss 39. Extension 62 terminates within the chambered boss 39, in a tail piece or cam-abutment element 64 which under certain conditions hereinafter appearing, is engaged by a cam-stud 66 carried on a side face of the worm gear 48. Cam-stud 66 as indicated in the drawing, is formed of a suitable insulating material, but if desired, the tail piece and arm extension may be provided of insulating material, while the cam-stud may be a projection integral with the worm gear. Switch arm 52 is constantly biased or urged in the clockwise direction about the stud 54, as viewed in Fig. 2, by a coil spring 67 centered on the stud 54 and having one spring arm 68 engaging or looped over the arm 52, the opposite spring arm 70 being anchored by an insulated post 71. Pivotal movement of arm 52 under the influence of spring 67, is limited by an insulated abutment or stop 72 positioned for engagement by the arm extension 62, while pivotal displacement thereof in the other direction, is limited by engagement of the arm 52 with an insulated abutment or stop 74. For a purpose to appear, the abutments 72 and 74 are so related to the arm 52 and its extension 62, that in the position of the switch as shown in Fig. 2, wherein the arm substantially abuts the stop 74, the tail piece 64 will be lifted or disposed in a position appreciably clear of engagement by the cam-stud 66, so that the latter when in rotation with the worm gear, will have no effect upon the switch. On the other hand, when the switch arm is in a position such as indicated in Fig. 5, wherein the arm extension abuts the stop 72, the tail piece 64 will occupy a lowered position for ready abutment by the cam-stud 66 in its circular movement with worm gear 48. Upon tail piece engagement by the cam-stud, the switch arm 52 will be pivoted toward abutment with stop 74, as this appears in Fig. 4.

The companion switch arm 59 differs from arm 52, in that the major portion of its length is formed by a relatively flat strip or leaf spring element 75 of suitable flexible or resilient material, fixed at one end to a substantially rigid element 76 which provides the pivotal support of the arm on the stud 60. Arm 59 is biased in the clockwise direction as viewed in Fig. 2, by a coil spring 78 on stud 60, the spring having one end anchored to an insulated post 79 and its opposite end secured to the element 76 of the arm.

The switch assembly as thus far described, is arranged in the control housing such that the spring element 75 of switch arm 59 overlies the plunger member 80 of a motor operated centrifugal device, wherein the plunger member has its stem 82 slidably received in an axial bore 83 in the upper end 42 of the motor shaft 34. The plunger 80 is directed to engage the switch arm spring element 75 intermediate the ends of the latter, preferably substantially at a longitudinal mid-point thereof, and the arm-engaging end 84 of the plunger is rounded substantially as shown, to facilitate smooth bending or flexure of the spring element 75. Displacement of plunger 80 is effected responsive to the action of centrifugal fly-weights 86 pivoted upon a carrier member 87 mounted upon and rotatable with the upper end 42 of the motor shaft 34, the fly-weights each having an actuating arm 88 in underlying engagement with a disc-flange 89 of the plunger. The function of the centrifugal device in switch control, will be described hereinafter.

Included in the control assembly is a manual or operator-actuated control member in the form of a rod 90 which is vertically movable through a bore 91 and 92 provided in bosses 93 and 94 formed interiorly of the housing wall 95. The space 96 between bosses 93 and 94 exposes a reduced section 98 of the rod for operative connection to the extension 99 on the free end of switch arm spring 75. Extension 99 is slotted at 100 to embrace the reduced portion of the rod between rod shoulders 102 and 103. Rod 91 extends upwardly from the top wall of the control housing and terminates in a control handle or knob 104 (Fig. 1) which in the vehicle-assembled position of the mechanism, is exposed above the dash board of the vehicle body, for ready manual access. The initial or normal inactive position of the rod is determined under downward bias of the rod by a suitable compression spring 106 arranged between boss 94 and a collar 107 on the lower end of the rod and by a spring loaded ball catch or detent 110 engaging in an annular groove 111 in the rod. The rod further is annularly reduced in the portion 112 below the groove 111, as for a purpose to appear.

Describing now the operation of the improved wiper mechanism, the motor switch and control elements occupy the relative position shown in Fig. 4 in the initial inactive condition of the mechanism. As there appears, the leaf spring contact arm 75 of the motor switch is held against the plunger 80 under the influence of spring arm 78, while the plunger is retracted to its lowermost position in the collapsed condition of the centrifugal device. The manual control rod 90 is in what may be called its "neutral" position, releasably held therein by the detent 110 in the rod groove 111. In such position of the rod, extension 99 on switch arm 75, embraces the rod reduced section 98 in a position intermediate the rod shoulders 102 and 103. The other switch arm 52 at such time, is in held elevated position by its tail piece 64 in engagement with the gear cam-stud 66, so that the contacts 56 and 58 separated with consequent open-circuiting of the motor supply circuit.

Before proceeding further with the operation, it is well to note that the cam-stud 66 is here utilized not only for switch actuation to open the contacts thereof, but as an index in effecting the drive connection of the wiper blades 14 to the cranks 15 such as to obtain a desired parked position of the blades in the off condition of the mechanism. As presently preferred, the wiper blade drive connections are adjusted so that when the cam-stud 66 is substantially adjacent the tip or trailing end of the tail pieces 64 (Fig. 4), each of the wiper blades 14 will be at one or the other end of its travel over the vehicle windshield, for example, each at the inner end of its stroke. Consequently, upon motor stoppage following opening of the motor switch by elevation of the switch arm 52 through cam-stud actuation of the tail piece 64, occurring whenever the switch is conditioned for such actuation as such will appear presently, the wiper blades will be then stopped or parked each at one end of its stroke, and hence out of the range of vision through the windshield.

Now when wiper operation is desired, the control rod 90 is manually displaced upwardly in the control housing, the lower rod shoulder 103 engaging the extension 99 and lifting the same and with it, the spring switch arm 75. As a result, the contact 58 will engage contact 56 on switch arm 52, while through the engaged contacts, the arm 52 will be rocked toward stop 74, the positions of the switch parts then being substantially as shown in Fig. 2. Such actuation of the switch not only engages the switch contacts to complete the energizing circuit for causing motor operation, but at the same time clears the tail piece 64 from the cam-stud 66, so that under normal conditions the motor will start and come up to speed relatively rapidly. Preferably, the rod 90 is manually held in actuated position momentarily at least, until wiper operation occurs, when it may be released for return movement under the influence of spring 106, as to the position indicated in Fig. 2, wherein the ball catch 110 is engaged in the rod reduced portion 112 at the upper end of the latter.

If the motor starts and is operating normally when the manual control rod 90 is released, the motor switch will be held in circuit-closed condition (Fig. 2) by the centrifugal device, the latter responding to motor operation by displacement of the plunger 80 thereof upwardly against the spring switch arm 75. Throughout motor operation above a predetermined minimum wiper operating speed, the plunger of the centrifugal control will impose on the switch arm 75 a continuous upward thrust varying in force with motor speed changes above the minimum, but sufficient to maintain the switch closed and the switch arm 52 immediately adjacent to or in contact with stop 74, whereby to maintain the tail piece 64 clear of the cam-stud 66 in the cyclical movement of the latter.

The centrifugal device is designed, with due regard to the switch arm biasing or loading springs 67 and 78 so that it will be effective as above described, at and above a predetermined low or minimum motor speed. Consequently, if during wiper operation the wiper blades should become overloaded or retarded as for example, by accumulation of snow or sleet in the paths of the blades, to an extent sufficient to cause motor slow-down below the predetermined minimum operating speed, the switch biasing springs 67 and 78 then will overcome the centrifugal device to effect conjoint pivotal lowering of the switch arms, as for example, to a position substantially as appears in Fig. 5. While the switch contacts remain closed to retain the motor energized the tail piece 64 of switch arm 52, is thereby lowered into the path of the cam-stud 66 rotating with the worm gear. The cam-stud 66 thereafter coming into engagement with the tail piece, lifts the latter to rock the switch arm 52 toward stop 74, thereby opening or disengaging the motor circuit contacts 56 and 58, whereupon the motor stops. In the present example, the wiper operating motor is selected as to its deceleration characteristics, such that the motor will come to a complete stop as the cam-stud approaches or attains the tip or trailing end of the tail piece 64, short of disengagement therefrom. This condition is utilized as hereinbefore described, to determine wiper blade parking out of the range of vision through the windshield, as at one or the other end of the wiping stroke.

Automatic cessation of wiper operation in the manner above described, will occur also in the event the motor energizing current fails or becomes insufficient for any reason, to maintain motor operation at least at or above the predetermined minimum speed necessary to continue the effectiveness of the centrifugal device to hold the motor switch closed. Similarly, if upon manual closure of the switch through actuation of rod 90, the motor fails to start or attain at least the minimum operating speed necessary for effective operation of the centrifugal switch holding device, the switch will assume the open circuit condition as illustrated in Fig. 4, following release of the rod 90.

When the wiper mechanism is operating normally, it may be stopped at will by manual displacement of the rod 90 to the position shown in Fig. 5, wherein the ball-catch 110 is engaged in the rod groove 111, this being the initial or wiper-off position of the manual control. As the rod is so positioned, the upper shoulder 102 at the reduced section 98 of the rod, engages the element 99 and displaces the same downwardly. Since element 99 is connected to the spring arm 75 of the switch, the latter is thereby tensioned in opposition to the lifting force of the centrifugally operated plunger 80, to a degree sufficient to flex or curve the spring arm over the plunger with its end supporting the contact 58, considerably lowered as shown in Fig. 5. As the contact-supporting end of the spring arm 75 is thus lowered, the switch arm 52 under the biasing influence of its spring 67, will follow the arm 75, pivoting downwardly with its contact 56 in full engagement with contact 58, thus maintaining momentarily at least, the motor circuit closed and the motor in operation. However, and as hereinbefore described, such pivotal movement of switch arm 52 serves to locate the tail piece 64 in the path of cam-stud 66, so that the latter ultimately will engage the tail piece and thereby lift the switch arm 52 toward its stop 74, with attending disengagement of contact 56 from contact 58. The motor thus stops, with the wiper blades parked each at one end of its stroke.

Accordingly, it now will appear from the foregoing that the presently improved wiper mechanism control is such as to afford starting of wiper action only in response to manual or operator-effected closure of the main motor circuit contacts, and to afford automatically in response to adverse operating conditions including failure of motor energizing current, open-circuiting of the main contacts and cessation of motor operation with the wiper blades stopped or parked in desired positions. Moreover, according to the present improvements, actuation of the manual control to its wiper-off position, does not thereby directly open-circuit the main contacts, but advantageously herein, conditions the main contacts for automatic open-circuiting thereof by the motor operated cam device at a time in the cycle of wiper operation, when the blades are at one end of their strokes.

While a provision for varying the speed of the wiper motor and hence the rate of wiper blade movement, is not shown in the control device as illustrated by Figs. 2 to 5, it is to be understood that any suitable speed varying means may be utilized with or embodied in the control unit, as may be desired. As presently preferred, the wiper operating motor 24 is a shunt motor of adequate power capacity for the purpose and since this type of motor is readily variable in speed as for example, by varying the strength of its shunt field, effective speed control thereof may be obtained conveniently by a variable resistance in the shunt field circuit. Illustrated by Fig. 6 is a suitable wiring circuit arrangement for the wiper motor and control unit as herein described, wherein the source of motor operating current may be the usual vehicle battery 115 having one side or terminal thereof grounded through ground lead 116. The opposite battery terminal is connected by a wire 117 to the usual vehicle ignition switch 118 and from the ignition switch extends wire 55 leading to connection with the post 54 of the motor switch assembly in the control housing of the unit. The opposite switch post 60 is connected by a wire 120, to the resistance element of a variable resistor unit 121, and from the resistance extends a wire 122 leading to motor terminal 124, the latter being connected to one end of the motor shunt field within the motor 24. The opposite end of the shunt field and one end of the motor armature are connected in common to the motor ground terminal 125 and thence to ground through ground lead 126. The armature circuit is completed through motor terminal 128 and a wire 129 leading to connection with the wire 120. Wiper motor 24 being of shunt type, actuation of the resistance unit to increase the shunt field resistance, will result in increased motor speed while decreasing the resistance will effect decreases in motor speed. It is again emphasized that starting of the wiper mechanism is subject solely to manual closure of the motor switch by the manual control, so that as is obvious from the circuit arrangement, closure of the ignition switch 118 merely conditions the circuit for wiper actuation upon operation of the manual control. In the event the ignition switch is opened while the wiper is in operation, the centrifugal device in the control unit will collapse as the motor becomes deenergized, thus allowing the spring arm 75 of the switch to pivot toward and to its lowermost position under the bias of its spring 78, as to the position shown in Fig. 4 for example. The other switch arm 52 thereby released, follows under the bias of its spring 67 until the arm extension 62 abuts stop 72, when the tail piece 64 will be disposed in the path of movement of the cam 66. However, the cam 66 may or may not engage the tail piece to lift the switch arm 52, following opening of the ignition switch, as such will depend upon the position of the cam relative to the tail piece when the ignition switch is opened. Nevertheless, with spring arm 75 in its lowermost position and the arm 52 positioned by stop 72, the contacts 56 and 58 will be separated sufficiently to determine an open-circuit condition of the switch. Should the cam 66 engage the tail piece 64 before the motor stops following opening of the ignition switch, the lifting of switch arm 52 merely increases the extent of separation of the contacts, but at the same time, the wipers will be parked as before described. Consequently, in any event the motor control switch is opened following opening of the ignition switch, so that upon reclosure of the latter, the wiper will remain inactive until the control switch is manually closed.

A novel and practical manner of embodiment of the variable resistance unit 121 in the motor control device of the present invention, is shown by Figs. 7 and 8 in which parts similar to those in the preceding figures are given corresponding reference numerals. The manual control element affords a ready and convenient actuator for the variable resistance, and in order to accommodate the resistance within the control housing 18 in operative association with the manual element, the control rod 90 and its mounting arrangement as appears in Fig. 2 are modified, all other parts of the control unit remaining substantially as heretofore described. The manually modified control rod 130 is slidably received in a bore 131 provided in casing enlargement or boss 132 upstanding in part, on the casing top wall 20. A spring loaded ball catch 134 is located in the boss for cooperation with an annular groove 135 in rod 130, to determine the wiper-off position of the rod (Fig. 8). The lower extension 136 of rod 130 is of reduced diameter, forming a rod shoulder 138 which serves the same purpose as shoulder 102 on rod 90 of Fig. 2. Formed or secured on the rod portion 136 at a predetermined distance from rod shoulder 138, is a flange or collar element 139 corresponding in purpose, to the rod shoulder 103 as provided on rod 90 according to Fig. 2. Below the collar 139 and suitably secured to the rod portion 136 in its terminal end section, is a resistance element comprising an insulator support 140 of suitable heat-resistant material, having exposed on its surface a resistance coil 142. One end of the resistance coil is connected preferably to a post 143 in a side wall of the casing, by a flexible and extensible lead 144, while lead 120 connects post 143 to post 60 of the motor switch.

The resistance element thus is movable with the manual control rod 130, occupying a lowered position in the control housing when the rod is in the wiper-off position (Fig. 8), and being elevated in the housing, as to the position shown in Fig. 7, when the rod is actuated to initiate wiper operation. Circuit connection of the resistance to the motor shunt field through motor terminal 124 (Fig. 6), is here effected by a spring contact finger 146 making slidable contact with resistance coil 142, and suitably supported in fixed position relative to the control casing, as by a terminal post 147 mounted in casing boss 148 by means insulating the post and spring contact from the casing and boss, the mounting means as illustrated in Fig. 8, including an insulator packing 150. A conductor 122 (Fig. 6) serves to connect the post 147 to the motor field terminal 124.

The mounting position of the spring contact finger 146 on the casing is determined with respect to the range of travel of the resistance coil 142, such that in manual elevation of rod 130 to effect closure of the motor contacts, as to the position shown in Fig. 7, the resistance coil 142 will be in contact with the spring finger 146 at or near the lower, motor circuit connected end of the coil. Consequently, no more than a small or minor portion of the resistance is then in the motor field circuit, thus conditioning the motor for high starting torque and low speed operation. As before indicated, the low speed operation of the motor obtaining with the resistance substantially cut-out, as described, is substantially the minimum required for effective operation of the centrifugal device to retain the motor switch contacts closed. Now when it is desired to increase the speed or rate of wiper blade operation, all that is required is to manually actuate the rod 130 toward its off position, thereby displacing the resistance coil 142 over the contact finger 146 such as to introduce more resistance in the motor shunt field circuit. In this way, the motor speed may be varied at will. It is to be noted that in the manual actuation of the rod 130 in the direction to introduce more resistance, and hence increase motor speed, the rod shoulder 138 ultimately will engage the extension 99 of the motor switch arm 75, actuating the latter downwardly as the off position of the rod is approached and attained (wherein the ball catch 134 seats in rod groove 135), thereby conditioning the motor switch for automatic open-circuiting thereof, as effected in the manner hereinbefore described.

The wiper control as described, fully attains the before stated objects and others now readily apparent, and provides a desirably compact unit including the operating motor, wherein the wiper blade worm gear drive, motor switch and operating controls are substantially totally enclosed so as to be shielded from dust and dirt.

Having now described the invention with respect to presently preferred embodiments of the same, it is to be understood that use of all modifications thereof as come within the spirit and scope of the invention defined by the appended claims is contemplated.

I claim:

1. A control for an electric motor operated windshield wiper, comprising a switch operable to a closed position for completing an energizing circuit to the motor, and at least two motor operated members, one thereof being rendered effective upon motor operation above a predetermined low speed, to hold the switch in closed position, and operable in response to motor operation below said low speed, to condition the switch for opening actuation, and the other of said members being effective in the latter condition of the switch, to open the switch.

2. A control for an electric motor operated windshield wiper, comprising a switch operable to a closed position for completing an energizing circuit to the motor, a motor operated centrifugal device effective during motor operation above a predetermined low speed, to retain the switch in closed position, said device in response to motor operation below said low speed, conditioning said switch for opening actuation, and an element having cyclical movement with the motor and effective following conditioning of the switch for opening actuation, to open the switch.

3. A control for electric motor operated windshield wipers, comprising a switch in control of an energizing circuit for the motor, manually actuated means for closing the switch to cause motor operation, means yieldably holding the switch closed responsive to normal operation of the motor, said manually actuated means being operable on said switch in opposition to said holding means, to shift at least a part of said switch for conditioning the switch for opening actuation, and an element having cyclical movement with the motor, engageable with the switch when the latter is so conditioned for opening actuation to open the switch.

4. A control for electric motor operated windshield wipers, comprising a switch in control of an energizing circuit for the motor, manually actuated means for closing the switch to cause motor operation, a motor operated centrifugal device effective during motor operation above a predetermined low speed for holding said switch closed, said device upon motor operation below said low speed automatically shifting at least a part of the switch for conditioning the same for opening actuation, and an element driven by the motor and engageable with the switch when the latter is so conditioned for opening actuation, to open the switch.

5. An operating control for electric motor driven windshield wipers, comprising a switch in control of an energizing circuit for the motor, the switch including cooperating, pivotally supported switch contact members one thereof having a projection, a manual control operable for pivotally moving said members in a direction to effect contact engagement thereof for causing motor operation, a motor operated centrifugal device effective during motor operation above a predetermined low speed, for holding said switch members in contact engagement, and an element having cyclical movement with the motor in a path extending adjacent the projection of said one switch member, said centrifugal device serving automatically in response to motor operation below said low speed, to cause pivotal movement of the switch members while in contact engagement, in a direction to position said projection in the path of movement of said element, and said element in its cyclical movement with the motor, engaging said projection when so positioned and effecting pivotal movement of the associated switch member relative to the other member to disengage the contact members and open the motor circuit.

6. An operating control for electric motor driven windshield wipers, comprising a switch in control of an energizing circuit to the motor, the switch including a switch member pivotally supported intermediate its ends, a contact on one end of the member and the other end of the member constituting a cam-follower, means biasing said switch member in one direction, a second switch member characterized by lateral flexibility, operatively supported near one end thereof and carrying a contact for circuit control cooperation with the first said contact, a camming element having cyclical movement with the motor in a path extending adjacent said cam-follower, a control member operatively associated with the switch and operable to move said switch members in a direction to engage the contacts thereof for motor operation, the resulting movement of the first said switch member serving to position said cam-follower end thereof out of the path of cyclical movement of said camming element, and a motor driven centrifugal device including an operating element engageable with said second switch member, effective during normal operation of the motor to hold said switch members in contact-engagement, said control member in the contact-engaged condition of the switch, being operable on said second switch member to cause lateral flexure thereof over said operating element of the centrifugal device, the first said switch member upon lateral flexure of the second switch member, being displaced under the influence of its biasing means, to maintain its contact in engagement with the contact of the second switch member and to position the cam-follower end thereof in the path of said camming element, and said camming element in its cyclical movement, engaging said cam-follower and actuating the same to cause pivotal movement of the associated switch member in opposition to said biasing means, whereby to effect separation of the switch contacts.

7. In an electrically operated windshield wiper mechanism providing an electric motor, a wiper, and drive means between the motor and wiper for effecting wiper movement in a predetermined stroke over the windshield, an operating and wiper parking control therefor, comprising a switch operable to a closed position for completing an energizing circuit to the motor, means operated by the motor for yieldably holding the switch in closed position responsive to operation of the motor above a predetermined low speed, said means serving automatically in response to motor operation below said low speed, to shift the switch while closed so as to condition the same for opening actuation, and an element having cyclical movement with the motor and effective upon such conditioning of the switch for opening actuation, to engage and open the switch, said element and said wiper drive means being relatively operatively arranged such that switch opening by said element occurs substantially as the wiper attains one end of its stroke.

8. A control for electric motor operated windshield wipers, comprising a switch operable to a closed position for completing an energizing circuit to the motor, a motor operated, speed sensitive device operable responsive to motor operation within a given speed range above a predetermined low speed, to hold the switch closed, said device serving automatically in response to motor operation below said low speed, to shift said switch so as to condition the same for opening actuation, a variable resistance device in the motor energizing circuit, operable to vary the motor speed in said given range, and means having cyclical movement with the motor and effective upon conditioning of the switch for opening actuation, to open the switch.

9. A control for electric motor operated windshield wipers, comprising a switch operable to a closed position for completing an energizing circuit to the motor, a motor operated centrifugal device responsive to motor speeds above a predetermined low speed, to hold said switch closed, manually actuated means operable on said switch in opposition to said holding device to shift the same to a position for opening actuation, said holding device being independently operable automatically in response to motor operation below said low speed, to shift the switch to said position for opening actuation, a member having cyclical movement with the motor and effective when the switch is in said position for opening actuation, to open the switch, and a variable resistance device in the motor energizing circuit, operable by said manually actuated means to vary the motor speed above said predetermined low speed.

10. A control for electric motor operated windshield wipers, comprising a switch in control of an energizing circuit to the motor, a manually operated member operatively associated with the switch and movable in one direction to a position to close said switch but ineffective for opening said switch, a motor driven, speed sensitive device for yieldably holding said switch closed during operation of the motor above a predetermined low speed, said manual member being operatively associated with at least a part of said switch and being movable in the opposite direction to shift at least said part so as to condition the switch for opening actuation, means having cyclical movement with the motor and operable when the switch is so conditioned for opening actuation, to open the switch, and a variable resistance device in the motor energizing circuit, operable by said manually operated member for varying the motor speed above said predetermined low speed, said variable resistance and manually operated member being relatively arranged such that in movement of the member to said position effecting switch closure, the resistance is actuated thereby to determine motor operation at its minimum operating speed above said predetermined low speed, and further such that in movement of the member toward and to said position conditioning the switch for opening actuation, the resistance is actuated to increase the motor speed up to a maximum obtaining in the last said position of the manually operated member.

11. An electric motor control comprising switch points in the feed circuit for the motor, actuator means for said points, a manual member constructed and arranged for closing said points to energize the motor and for simultaneously shifting said actuator from a first to a second position, a device operable by said motor during normal operation thereof for holding said points closed and for maintaining said actuator in said second position, and a second device operable by said motor and capable of automatically shifting said actuator when in said first position only for opening said points, said actuator being shiftable from said second to said first position either by said manual member or, automatically, responsive to shifting of said motor operated device upon abnormal motor operation.

12. An electric motor control comprising switch points in the feed circuit for the motor, an actuator element operatively connected to at least one of said points, a manual member constructed and arranged for closing said points to energize the motor and for simultaneously shifting said actuator from a first to a second position, a centrifugal device operable by said motor during normal speed operation thereof for holding said points closed and maintaining said actuator in said second position, and a device operable cyclically with said motor and capable of engaging and shifting said actuator when in said first position only for opening said points, said actuator being shiftable from said second to said first position either by said manual member or, automatically, by said centrifugal device upon abnormal low speed operation of the motor.

13. An electric motor control comprising a pair of movably mounted switch arms, each carrying a switch point interposed in the feed circuit to the motor, an actuator operatively connected to one of said arms and movable therewith, yielding means normally urging said arms and said actuator each into a first position, said points being closed with said arms in said positions, a manual member operatively associated with said arms for shifting the same and said actuator from said first positions to second positions and vice versa with said points closed, a device shiftable responsive to normal operation of the motor to a position for yieldingly holding said arms and said actuator in said second positions against said first mentioned yielding means, and an element movable with said motor in a path to engage and shift said actuator when in its first position for opening said points.

IRVEN E. COFFEY.

REFERENCES CITED

The following references are of record in the file of this patent:

UNITED STATES PATENTS

| Number | Name | Date |
|---|---|---|
| 1,491,396 | Hall | Apr. 22, 1924 |
| 1,611,102 | De Bell | Dec. 14, 1926 |
| 1,822,304 | Miller et al. | Sept. 8, 1931 |